US008157077B2

(12) United States Patent
Xie et al.

(10) Patent No.: US 8,157,077 B2
(45) Date of Patent: Apr. 17, 2012

(54) CLUTCH DEVICE FOR ELECTRIC WINCHES

(76) Inventors: Yuzhi Xie, Zhejiang (CN); Kuo-hsiang Tsao, Taiwan (CN)

( * ) Notice: Subject to any disclaimer, the term of this patent is extended or adjusted under 35 U.S.C. 154(b) by 458 days.

(21) Appl. No.: 12/377,703

(22) PCT Filed: Aug. 13, 2007

(86) PCT No.: PCT/CN2007/002423

§ 371 (c)(1),
(2), (4) Date: Feb. 17, 2009

(87) PCT Pub. No.: WO2008/022545

PCT Pub. Date: Feb. 28, 2008

(65) Prior Publication Data

US 2010/0155190 A1 Jun. 24, 2010

(30) Foreign Application Priority Data

Aug. 17, 2006 (CN) .......................... 2006 1 0052982

(51) Int. Cl.

| | |
|---|---|
| ***F16D 67/00*** | (2006.01) |
| ***F16H 57/10*** | (2006.01) |
| ***B60W 10/10*** | (2012.01) |
| ***B60W 10/18*** | (2012.01) |
| ***B66D 1/22*** | (2006.01) |

(52) U.S. Cl. ...................... 192/223.1; 192/215; 254/344

(58) Field of Classification Search ................. 188/72.1, 188/72.7–72.9, 73.1; 242/396, 396.1; 254/342, 254/345, 346, 355, 356, 357, 366, 370, 375, 254/376; 475/317, 319, 320, 321; 192/215, 192/223.1, 93 A, 95; 74/473.3, 473.14, 473.15
See application file for complete search history.

(56) References Cited

U.S. PATENT DOCUMENTS

| | | | | |
|---|---|---|---|---|
| 5,261,646 | A | 11/1993 | Telford | |
| 5,842,684 | A * | 12/1998 | Aho | 254/344 |
| 6,520,486 | B2 * | 2/2003 | Huang | 254/347 |
| 6,604,731 | B2 * | 8/2003 | Hodge | 254/344 |
| 6,663,086 | B2 * | 12/2003 | Huang | 254/344 |
| 6,916,267 | B2 * | 7/2005 | Jones et al. | 475/299 |
| 7,568,559 | B2 * | 8/2009 | Huang | 188/72.7 |

FOREIGN PATENT DOCUMENTS

| | | |
|---|---|---|
| CN | 2466129 | 12/2001 |
| CN | 2484297 | 4/2002 |
| CN | 1907837 | 2/2007 |
| CN | 1907838 | 2/2007 |

* cited by examiner

*Primary Examiner* — David D Le
*Assistant Examiner* — Michael Gonzalez
(74) *Attorney, Agent, or Firm* — Dickinson Wright PLLC

(57) ABSTRACT

A clutch device for an electric winch includes a ring gear that is settled in a gear box and is in communication with a gear mechanism of the electric winch. A plurality of braking recesses are provided on the outer periphery surface of the ring gear. A detachable clutch sleeve is fixed in a braking port defined in the gear box and includes a T-shaped clutch lever. A clutch handle is provided on the sleeve. The inner surface of the clutch handle and the top surface of the clutch sleeve are cam faces formed by double tapered faces. A rotating-positioning mechanism, which can be rotated 180 degrees, is provided between the clutch handle and the clutch sleeve. The clutch lever is movable between an engaged position, where the clutch lever engages the braking recesses, and a disengaged position, when the clutch handle is rotated in clockwise and anticlockwise directions.

4 Claims, 9 Drawing Sheets

CLUTCH DEVICE FOR ELECTRIC WINCHES

CROSS-REFERENCE TO RELATED APPLICATIONS

This application is a National Stage of International Application No. PCT/CN2007/002423, filed Aug. 13, 2007. This application claims the benefit and priority of Chinese Application No. 200610052982.4, filed Aug. 17, 2006. The entire disclosure of each of the above applications is incorporated herein by reference.

FIELD OF THE INVENTION

The present invention relates to a clutch device for electric winches.

DESCRIPTION OF THE PRIOR ART

In the field, it is known to use electric brakes to pull goods via a reeling tight wire rope for use in self-aid and the aid of buddies in automobile accidents. The electric winches are mostly provided with clutch devices. While automobiles or the other objects in the accident are far away from the rescue device, it is requested that the user can directly pull out a wire rope conveniently to hook to the automobiles in the accident. Chinese Patent No. 01204721.X discloses a braking device and its clutch device for an electric winch. The braking device includes a ring gear that is settled in a gear box and is in communication with the gear mechanism installed in the gear box. A plurality of braking recesses are provided on the outer periphery surface of the ring gear. A clutch sleeve is provided in a braking port of the gear box that corresponds to the braking recesses. A reversed T-shaped clutch lever with elastic elements is provided in the sleeve. A clutch handle is provided above the sleeve. When it is desired to pull out the wire rope wrapped around the wire rope roll drum, a user only needs to pull the handle up then rotate it to move it a slight angle, so that the clutch lever synchronous with the handle and disengages from the braking recesses of the ring gear to make the ring gear rotate. Then the wire rope can be pulled out to be hooked to the dragged objects. When the handle goes back to make the clutch lever engage with the braking recesses, the power of the gear mechanism is transmitted to the wire rope roll drum. After the rotation of the handle, the wire rope can be pulled back by the power of the motor to realize the purpose of dragging the objects hooked by the wire rope. However, the operation is arduous and inconvenient since the style of the operation for the clutch handle requires pulling the handle up and after the handle is pulled upward, rotating the handle 90 degrees.

SUMMARY OF THE INVENTION

An object of the present invention is to provide a clutch device for electric winches which has the advantages of saving labor, convenience and safety when using.

To realize the above-mentioned object, a tapered braking device for an electric winch in accordance with the present invention is disclosed.

A clutch device for an electric winch includes a gear box that is positioned outside of a gear mechanism of the electric winch. A ring gear is settled in the gear box and functions in communication with the gear mechanism. A plurality of braking recesses are provided on the outer periphery surface of the ring gear. A breaking port is provided in the gear box and corresponds to the braking recesses on the ring gear. A detachable clutch sleeve is fixed in the braking port. A reversed T-shaped clutch lever is provided in the sleeve. An elastic element bushing is disposed between the clutch lever and the clutch sleeve. A clutch handle is provided on the sleeve. The clutch handle is connected to the clutch lever and is operated by rotating the clutch handle. The inner surface of the clutch handle and the top surface of the clutch sleeve are cam faces each formed by double tapered faces. Four flanges are homogeneously distributed on the periphery of the inner surface of the clutch handle. Two of the flanges which are arranged diagonally to one another are relatively shorter than the other two flanges, and the other two of the flanges, which are arranged diagonally to one another, are relatively longer than the other two flanges. The four flanges form a circle which contains or engages the outer surface of the clutch sleeve. A rotating-positioning mechanism, which can be rotated 180 degrees, is provided between the clutch handle and the clutch sleeve.

The braking port of the gear box is screwed to the clutch sleeve. A tightening screw is provided on the side surface of the braking port of the gear box.

The rotating-positioning mechanism is formed by spring pins which are arranged at the two radial sides of the top portion of the clutch sleeve in combination with the long flanges that are arranged diagonally on the clutch handle. The outer ends of the spring pins extend outward a length.

The amount of the braking recesses provided on the outer periphery surface of the ring gear are 4 to 12.

Compared with the prior art, the style for operating the clutch handle in the present invention is changed from the up-pulling operation to a rotating operation. In the present invention, a user only needs to rotate the clutch handle in clockwise and counterclockwise directions at 180 degrees. By the principle of the cam face construction formed by double tapered faces, the clutch handle can be positioned in two directions. The present invention has the following advantages: first, simplifying the construction; second, saving the labor, convenience and safety during the operation of the clutch device; and lastly, missing and the locking of the clutch will not appear during usage, accordingly extending the service life, which has the exceeded purpose to the development of the clutch device for the electric winch.

DETAILED DESCRIPTION OF THE INVENTION

Figure 1:
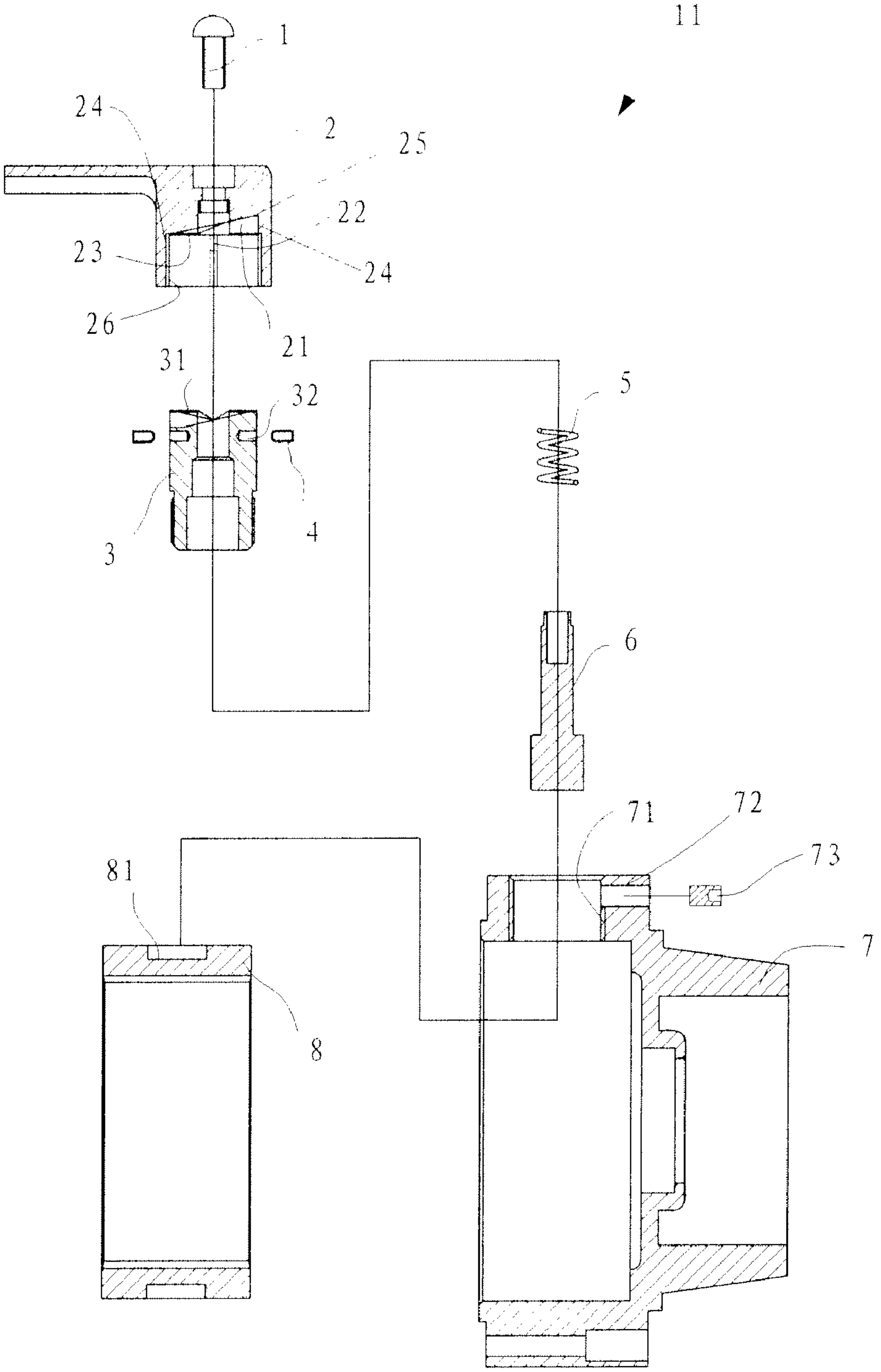
FIG. 1 is a structural exploded view of a clutch device for an electric winch according to the present invention.
Figure 2:
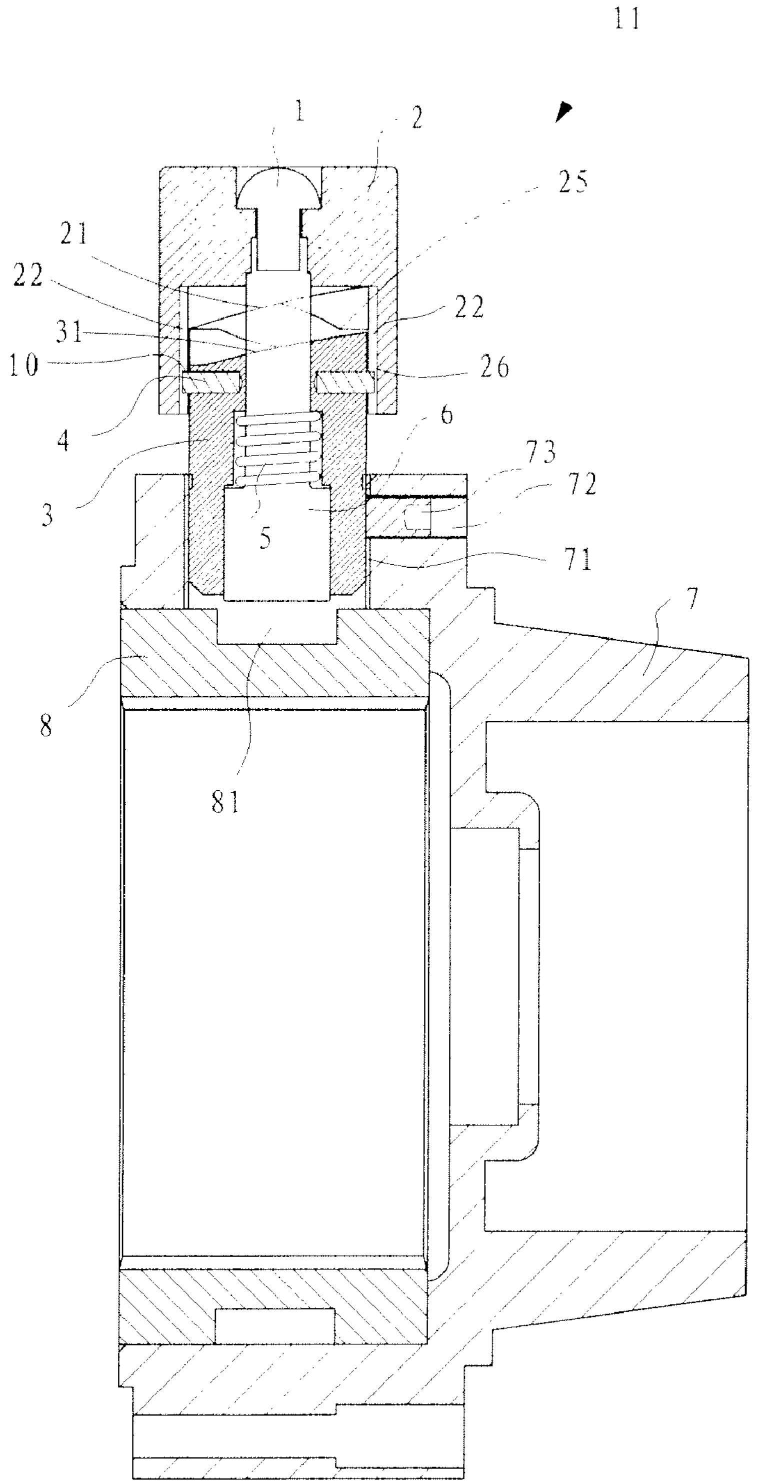
FIG. 2 is a structural view showing the disengaged state of the clutch device for the electric winch according to the present invention.
Figure 3:
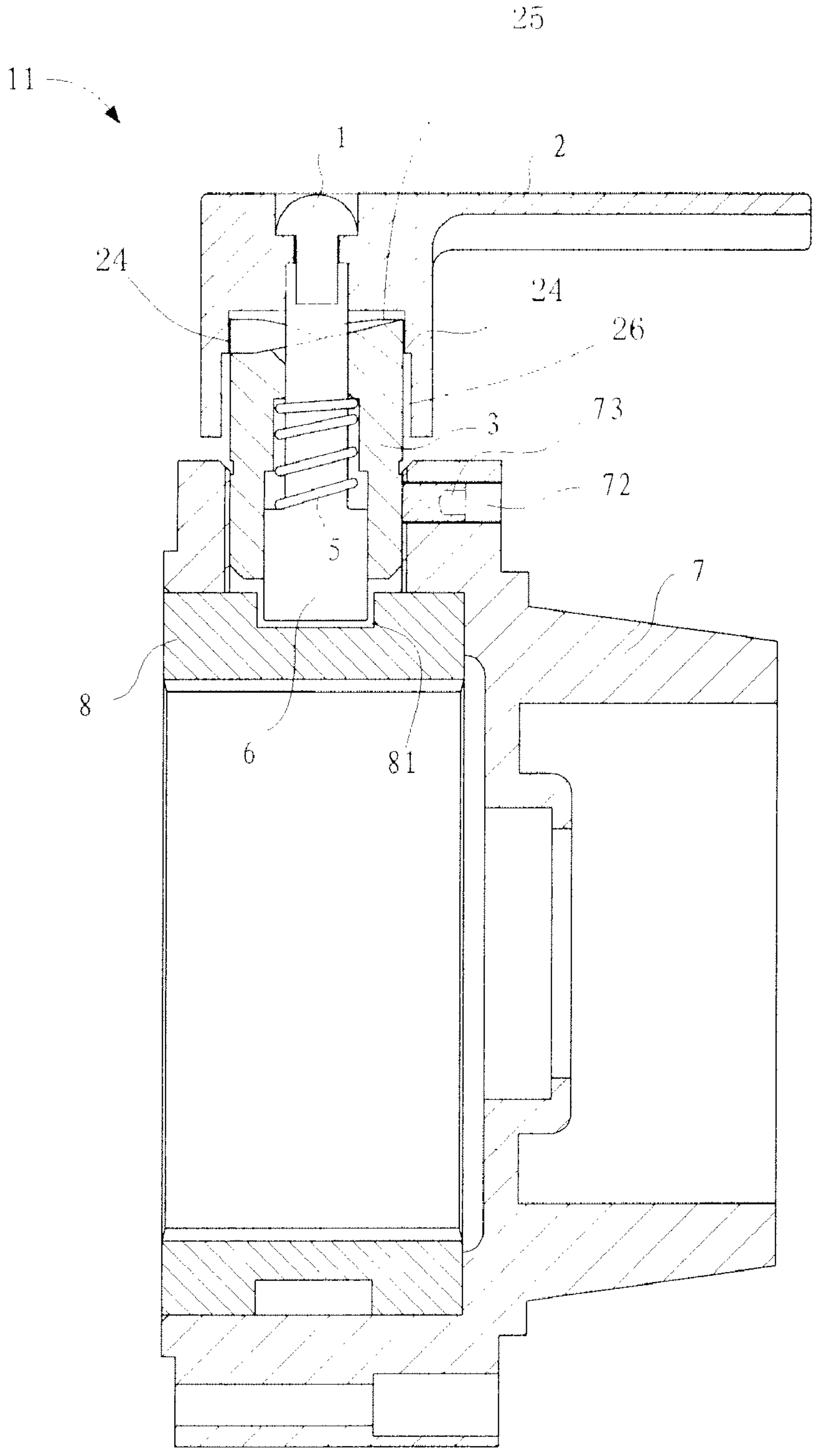
FIG. 3 is a structural view showing the engaged state of the clutch device for the electric winch according to the present invention.
Figure 4:
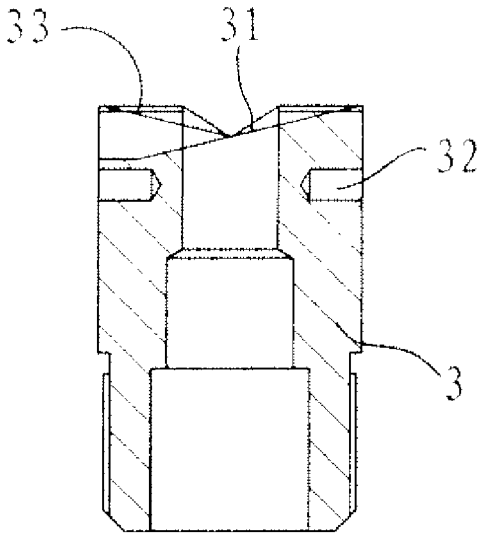
FIG. 4 is a structural cross-sectional view of the clutch sleeve.

The following is the detailed description of the embodiment of the present invention in connection with the appended drawings.

As shown in FIGS. 1-4, a clutch device 11 for an electric winch includes a gear box 7 that is positioned outside of a gear mechanism 9 of the electric winch. A ring gear 8 is settled in the gear box 7 and functions in communication with the gear mechanism 9. Eight braking recesses 81 are provided on the outer periphery surface of the ring gear 8. A breaking port 71 is provided in the gear box 7 and corresponds to the braking recesses 81. To realize the purpose of the detachably fixed connection, a clutch sleeve 3 having an outer screw thread, is installed rotatablely in the braking port 71 and is fixed by a tightening screw 73 disposed in a side screw hole 72. The top surface of the clutch sleeve 3 is a cam face 31 that is formed by the double tapered face. A pair of pin holes 32 are symmetrically provided at both of the radial sides of the top portion of the clutch sleeve 3, to match tightly with spring pins 4. The outer ends of the spring pins 4 extend outward 1 mm from the hole 32 when the spring pins 4 are placed in the pin holes 32.

The inner hole of the clutch sleeve 3 is a stepped construction. That is, while the inner hole extends through the clutch sleeve 3, the diameter of the inner hole varies from the top to the bottom of the clutch sleeve 3. A reversed T-shaped clutch lever 6 is provided in the sleeve 3, and can be inserted into the braking recesses 81. An elastic element 5, for example a pressed spring, is disposed between the clutch lever 6 and the clutch sleeve 3 and pushes on the clutch lever 6. A clutch handle 2 is provided on the clutch sleeve 3. The clutch handle 2 is connected with or engages the clutch lever 6 by a connection mechanism 1. In the exemplary embodiment, the connection mechanism 1 is a round-headed inner hexagon screw. The top inner surface 25 of the clutch handle 2 is a cam face 21 formed by the double tapered faces 23, which engages the cam face 31 of the top surface of the clutch sleeve 3 formed by the double tapered faces 33. The clutch lever 6 will be engaged or disengaged with the braking recesses 81 of the ring gear by rotating the clutch handle 2 in a clockwise or a counterclockwise direction to lift and drop the clutch lever 6. Four flanges 22, 24 are homogeneously distributed on the periphery of the inner surface 26 of the clutch handle 2. Two of the flanges 24, which are arranged diagonally and are shorter than the other two flanges 22, are settled on the inner surface 26. The other two of the flanges 22, which are longer than the other two flanges 24, are provided from the top inner surface 25 to the bottom of the clutch handle 2 along the inner surface 26. These four flanges form a circle which contains or engages the outer surface of the clutch sleeve 3.

A rotating-positioning mechanism 10, which can be rotated 180 degrees, is provided between the clutch handle 2 and the clutch sleeve 3. The rotating-positioning mechanism 10 is formed by spring pins 4 which are provided at both of the radial sides of the top portion of the clutch sleeve 3 and combined with the diagonal long flanges 22 which are provided on the periphery of the inner surface 26 of the clutch handle 2. When the clutch sleeve 3 is rotated, the movement of the two spring pins 4 is fixed or limited by the connection with the two long flanges 22 of the clutch handle 2.

When the clutch handle 2 is rotated in the counterclockwise direction 180 degrees, the clutch device 11 is in the disengaged state. Since the difference between the two inclines of the cam faces 21, 31, which are formed by the double tapered faces 23, 33 at the top end of the clutch sleeve 3 and top inner surface 25 of the clutch handle 2, changes from lower to higher, the clutch lever 6 is made to be disengaged from the braking recesses 81 of the ring gear 8. The positions of the clutch lever 6 are limited by the positioned construction of the spring pins 4 on the clutch sleeve 3 and the diagonal long flanges 22 which are provided on the periphery of the inner surface 26 of the clutch handle 2. In the disengaged state, the wire rope is pulled out. The gear mechanism 9 and the ring gear 8 associated with the gear mechanism 9 are rotated freely, so that the wire rope can be pulled out to be hooked to the dragged objects. On the contrary, when the clutch handle 2 is rotated in clockwise direction 180 degrees the clutch device 11 is in the engaged state. The difference between the inclines is changed from the higher position to the lower position, so that the clutch lever 6 is made to be engaged with the braking recesses 81 of the ring gear 8. In the engaged state, the clutch lever 6 is also limited by the positioned construction of the spring pins 4 and diagonal long flanges 22. At this time, the power of the gear mechanism 9 is transmitted to the wire rope roll drum. Therefore, the wire rope is pulled back via the power of the motor to realize the purpose of pulling back the hooked object.

Figure 5:
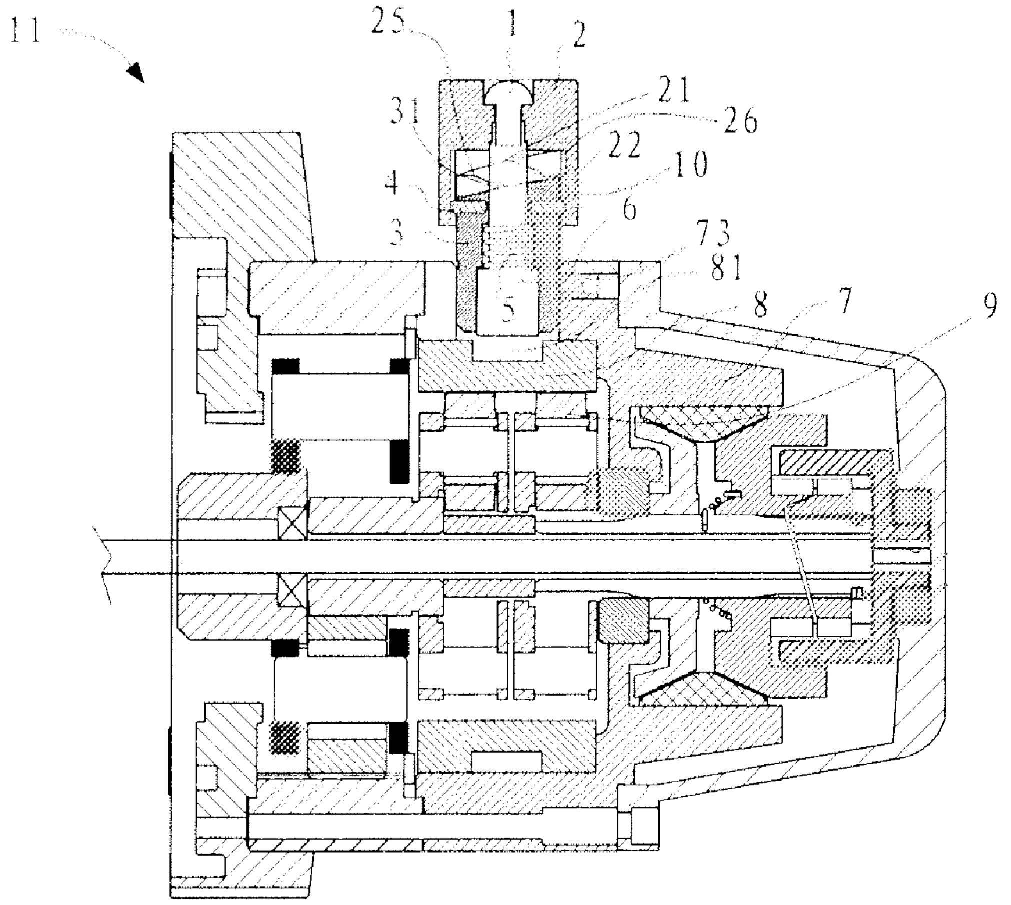
FIG. 5 is a view showing the relationship of the position between the clutch device and a braking device in the electric winch (disengaged state of the clutch device)
Figure 6:
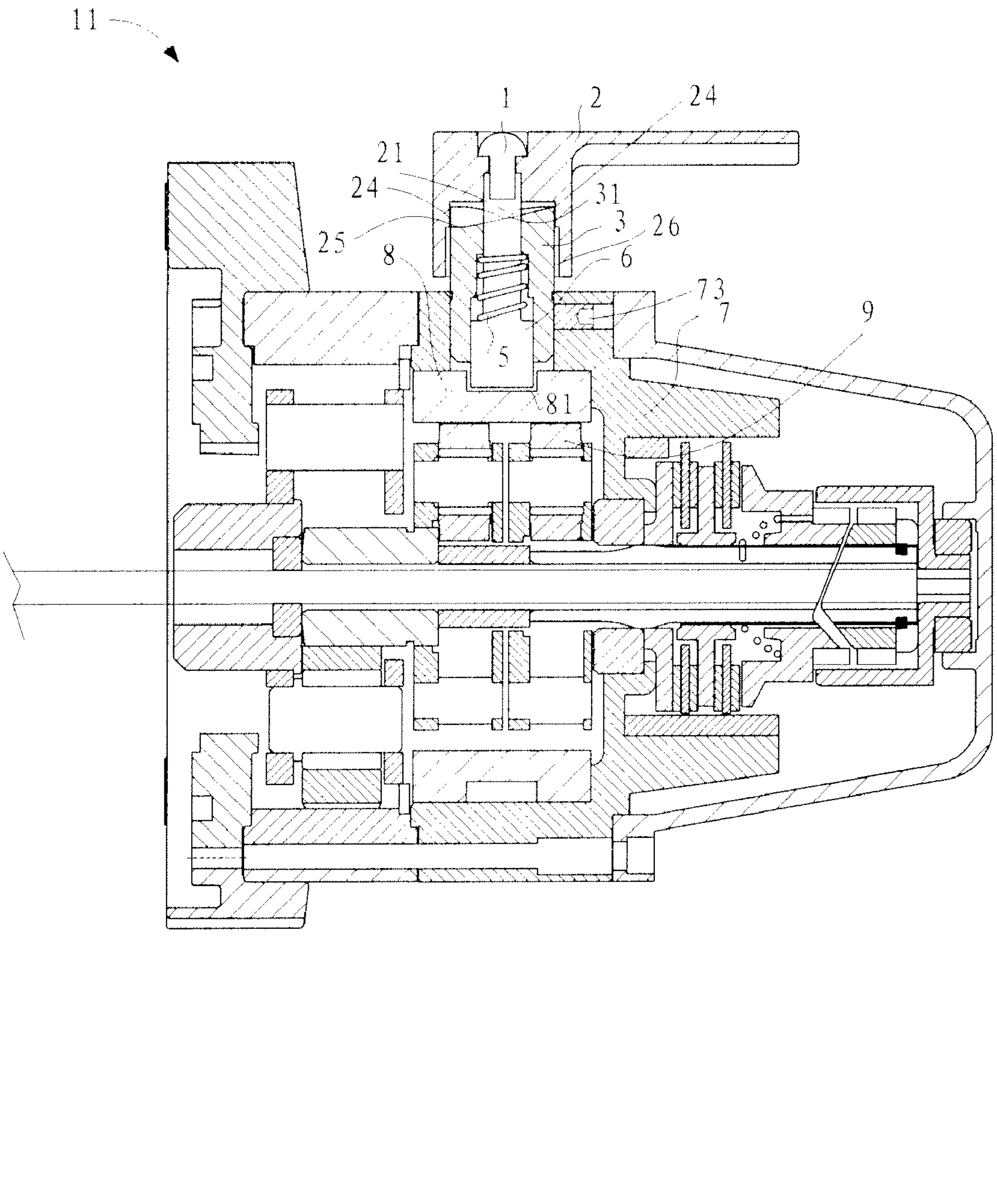
FIG. 6 is a view showing the relationship of the position between the clutch device and the braking device in the electric winch (engaged state of the clutch device)
Figure 7:
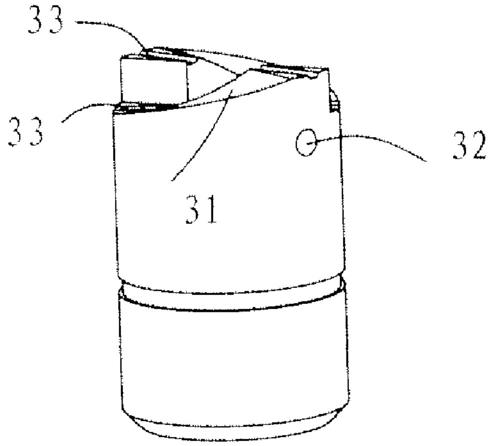
FIG. 7 is a perspective view showing the clutch sleeve according to the subject invention.
Figure 8:
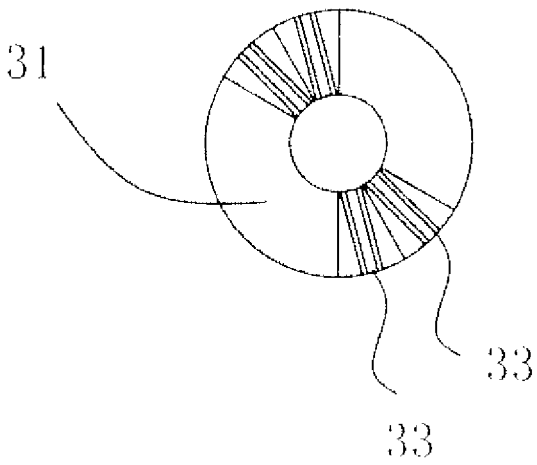
FIG. 8 is a top view showing the cam face of the clutch sleeve according to the subject invention.
Figure 9:
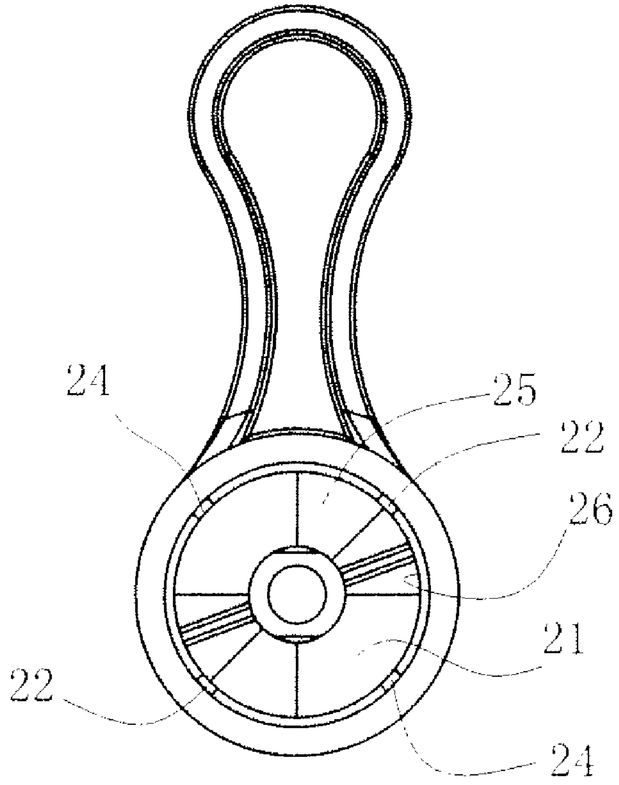
FIG. 9 is a bottom view showing the cam face and four flanges of the clutch handle according to the subject invention.

The installation view and the view showing the relationship of the position between the clutch device 11 and the double tapered faces 23, 33 as shown in FIG. 5 and FIG. 6.

What is claimed is:

1. A clutch device for an electric winch comprising:

a gear box positioned outside of a gear mechanism of the electric winch;

a ring gear settled in the gear box and in communication with the gear mechanism;

a plurality of braking recesses provided on an outer periphery surface of the ring gear;

a braking port provided in the gear box and corresponding to the braking recesses of the ring gear;

a detachable clutch sleeve fixed in the braking port;

a reversed T-shaped clutch lever provided in the clutch sleeve;

an elastic element disposed between the clutch lever and the clutch sleeve; and a clutch handle being rotatable and provided on the clutch sleeve and connected with the clutch lever by a connection mechanism, a top inner surface of the clutch handle and a top surface of the clutch sleeve having cam faces formed by double tapered faces, the clutch handle having four flanges being homogeneously distributed on a periphery of an inner surface of the clutch handle, wherein two of the flanges being arranged diagonally are short flanges being relatively shorter than the other two flanges being long flanges and arranged diagonally, the four flanges forming a circle for containing an outer surface of the clutch sleeve; and a rotating-positioning mechanism being rotatable in 180 degrees provided between the clutch handle and the clutch sleeve.

2. The clutch device for the electric winch as claimed in claim 1, wherein the rotating-positioning mechanism includes spring pins being arranged at two radial sides of a top portion of the clutch sleeve and the long flanges arranged diagonally on the clutch handle, and wherein an outer end of the spring pins extend outward a length to engage the long flanges of the clutch handle when the clutch handle is rotated.

3. The clutch device for the electric winch as claimed in, claim 1 wherein the amount of the braking recesses provided on the outer periphery surface of the ring gear are four to twelve.

4. The clutch device for the electric winch as claimed in claim 1, wherein the clutch sleeve is fixed within the braking port of the gear box by a tightening screw disposed in a side screw hole of the gear box.

* * * * *